US009934140B1

(12) United States Patent
Pawar et al.

(10) Patent No.: US 9,934,140 B1
(45) Date of Patent: Apr. 3, 2018

(54) ALLOCATING BLOCKS IN STORAGE SYSTEMS

(75) Inventors: Sitaram Pawar, Shrewsbury, MA (US); Kumar V.K.H. Kanteti, South Grafton, MA (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 293 days.

(21) Appl. No.: 13/431,224

(22) Filed: Mar. 27, 2012

(51) Int. Cl.
*G06F 12/02* (2006.01)
*G06F 3/06* (2006.01)

(52) U.S. Cl.
CPC ........ *G06F 12/0246* (2013.01); *G06F 3/0614* (2013.01); *G06F 3/0643* (2013.01); *G06F 3/0683* (2013.01)

(58) Field of Classification Search
USPC .......................................................... 711/117
See application file for complete search history.

(56) References Cited

U.S. PATENT DOCUMENTS

| 6,470,413 | B1 * | 10/2002 | Ogawa ........................ 711/103 |
| 6,654,772 | B1 * | 11/2003 | Crow et al. |
| 7,418,465 | B1 * | 8/2008 | Lewis et al. |
| 2007/0005894 | A1 * | 1/2007 | Dodge ........................ 711/118 |
| 2007/0294500 | A1 * | 12/2007 | Falco et al. .................. 711/170 |
| 2008/0250218 | A1 * | 10/2008 | Jordan ......................... 711/170 |
| 2009/0313426 | A1 * | 12/2009 | See et al. ..................... 711/112 |
| 2010/0023672 | A1 * | 1/2010 | Gorobets et al. ............ 711/103 |
| 2010/0057791 | A1 * | 3/2010 | Schneider .................... 707/205 |
| 2010/0121895 | A1 * | 5/2010 | Rajakarunanayake ...... 707/823 |
| 2011/0314246 | A1 * | 12/2011 | Miller et al. ................. 711/170 |
| 2013/0067187 | A1 * | 3/2013 | Moss et al. ................... 711/170 |

* cited by examiner

*Primary Examiner* — Ann J Lo
*Assistant Examiner* — Leandro R Villanueva
(74) *Attorney, Agent, or Firm* — Krishnendu Gupta; Deepika Bhayana

(57) ABSTRACT

A method is used in allocating blocks in storage systems. A block allocation request is received for a file of a file system. The block allocation request includes a data block allocation request and an indirect block allocation request. A type of the file is determined. A cylinder group is selected from a set of cylinder groups for allocating an indirect block based on the block allocation request. A set of data blocks is reserved for allocating a data block based on the type of the file.

16 Claims, 10 Drawing Sheets

LOGICAL VIEW MAPPED TO FILESYSTEM BLOCKS

ALLOCATING BLOCKS IN STORAGE SYSTEMS

BACKGROUND

Technical Field

This application relates to allocating blocks in storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

File systems typically include metadata describing attributes of a file system and data from a user of the file system. A file system contains a range of file system blocks that store metadata and data. A user of a filesystem access the filesystem using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be many levels of indirect blocks arranged in an hierarchy depending upon the size of a file where each level of indirect blocks includes pointers to indirect blocks at the next lower level.

SUMMARY OF THE INVENTION

A method is used in allocating blocks in storage systems. A block allocation request is received for a file of a file system. The block allocation request includes a data block allocation request and an indirect block allocation request. A type of the file is determined. A cylinder group is selected from a set of cylinder groups for allocating an indirect block based on the block allocation request. A set of data blocks is reserved for allocating a data block based on the type of the file.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
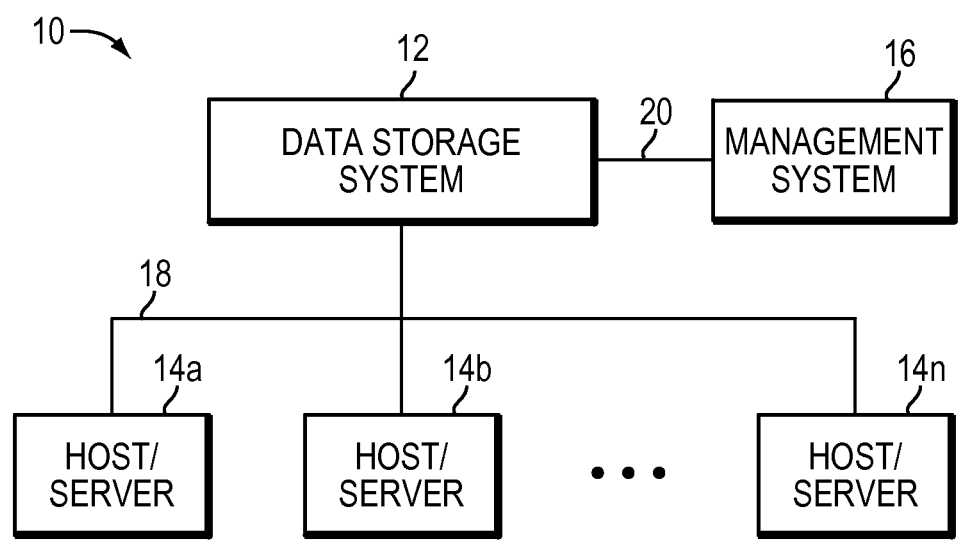
FIGS. 1-3 are examples of an embodiment of a computer system that may utilize the techniques described herein.

Described below is a technique for use in allocating blocks in storage systems, which technique may be used to provide, among other things, receiving a block allocation request for a file of a file system, where the block allocation request includes a data block allocation request and an indirect block allocation request, determining a type of the file, based on the block allocation request, selecting a cylinder group from a set of cylinder groups for allocating an indirect block, and based on the type of the file, reserving a set of data blocks for allocating a data block.

A file is uniquely identified by a file system identification number. Each data block of a file is referenced by a logical block number and/or file system block number. A logical block number of a file refers to a data block by relative position of the data block inside the file. A file system block number of a file refers to a data block by relative position of the data block on a physical disk device on which the file is stored. A file system block number for a data block is computed based on a file offset and the size of the data block. Further, an inode of a file includes metadata that provides a mapping to convert a file system block number of a data block to its corresponding logical block number. For example, in case of a data block size of 4 kilobytes (KB), if a file offset value is smaller than 4096 bytes, the file offset corresponds to the first data block of the file, which has file block number 0. Further, for example, if a file offset value is equal to or greater than 4096 bytes and less than 8192 bytes, the file offset corresponds to the second data block of the file, which has file block number 1.

Generally, each file system data block of a file is associated with a respective mapping pointer. A mapping pointer of a file system block points to the file system block and includes metadata information for the file system block. A file system block associated with a mapping pointer may be a data block or an indirect data block which in turn points to other data blocks or indirect blocks. A mapping pointer includes information that help map a logical offset of a file system block to a corresponding physical block address of the file system block. Further, a mapping pointer of a file system block includes metadata information for the file system block. Mapping pointers of the inode may include mapping pointers pointing to direct data blocks and mapping pointers pointing to indirect data blocks.

Typically, space is allocated to a file when a write I/O operation is performed on the file. Each time data is written to a file, a new data block may be allocated to store the data. If data blocks of a file are allocated on a storage device in an order that is same or similar to the order in which the data blocks are logically organized in a file system hierarchy, a client can efficiently read and/or write to the data blocks. Further, I/O performance of a file increases, if data blocks of the file are sequentially allocated on a storage device because accessing the data blocks of the file in such a case involves less movements of disk heads. Further, in such a case, a seek time required for locating a data block is reduced, and the number of disk I/O operations between the file and the storage device is reduced.

Conventionally, a data block is allocated for a file of a file system by selecting an available data block from a cylinder group of a set of cylinder groups associated with the file system that stores the inode of the file. Generally, a cylinder group may include up to, for example, 8192 inodes. Thus, in such a conventional system, up to 8192 files may select the same cylinder group for allocating data blocks thereby causing data block fragmentation in such a way that none of the 8192 files may be able to allocate a set of contiguous data blocks in the cylinder group.

Conventionally, multiple write I/O operations performed concurrently on files of a file system creates data block fragmentation in a physical storage layout of the file system on a storage device in such a way that data blocks allocated for respective files of the file system are interleaved with each other such that the order in which the data blocks of the respective files are allocated does not matches with the order in which the data blocks are logically mapped in respective file system hierarchy. Further, in such a conventional system, writing to a file system that includes small sized files and large sized files creates data block fragmentation in a physical storage layout of the file system on a storage device because a conventional data block allocation logic does not take into account the size of a file when allocating a data block for the file. Further, in such a conventional system, it is difficult or impossible to create a large number of files in the file system as the file system is unable to efficiently allocate data blocks because the file system iterates over a large set of cylinder groups in an inefficient sequential manner. Further, in such a conventional system, if the size of a file of a file system increases and additional storage space is provisioned for the file, it is difficult or impossible to allocate data blocks from the additional storage space as each cylinder group of a set of cylinder groups of the file system is evaluated starting from the first cylinder group instead of evaluating a cylinder group that may include available data blocks corresponding to the additional storage space. Consequently, in such a conventional system, if the size of a file, for example, is in terabytes, it may take a long time to iterate over cylinder groups of a set of cylinder groups before allocating an available data block that may be stored in last cylinder group of the set of cylinder groups. Consequently, in such a conventional group, iterating over a large set of cylinder groups of a file system consumes more storage resources and memory of a storage system. Further, in such a conventional system, a file system that includes a large number of files becomes fragmented in such a way that I/O performance of read and/or write operations performed on the file decreases.

Conventionally, when allocating a data block for a file, a cylinder group that includes the inode structure of the file is selected in order to keep the meta-data and data blocks close to each other. Further, in such a conventional case, if are no free blocks exists in a cylinder group of a set of cylinder group that includes the inode structure of a file, remaining cylinder groups of the set of cylinder groups are evaluated in a sequential manner in order to find available data blocks for allocation.

Generally, an application of a file system access one or more contiguous data blocks of a file of the file system at the same or similar time. Thus, conventionally, a data storage system attempts to allocate each data block of a file of a file system in the same cylinder group of the file system, preferably at rotationally optimal positions in the same cylinder. As a result, in such a conventional system, each write I/O request of a set of write I/O requests performed concurrently on files of a file system may target the same cylinder group for allocating data blocks for the files thereby spreading out allocations of the data blocks such that accessing logically contiguous data blocks of a file may involve a long disk seek operation.

Conventionally, a direct data block for a file of a file system is allocated in a cylinder group that stores the inode of the file. Further, in such a conventional system, a non-direct data block for a file of a file system such as an indirect block and data blocks included in an indirect block, a cylinder group is selected from a set of cylinder groups of the file system by iterating over the set of cylinder groups and evaluating each cylinder group of the set of cylinder group to find an under utilized cylinder group. Further, in such a conventional system, an under utilized cylinder group is selected from a set of cylinder groups of a file system for allocating an indirect block and data blocks for the indirect block for a file in such a way that the under utilized cylinder group has a greater than average number of free blocks left. Further, two or more files may select the same cylinder group as an under utilized cylinder group and allocate an indirect block and data blocks from the cylinder group thereby creating data block fragmentation situation by interleaving data blocks of the two or more files in the cylinder group. However, in such a conventional system, multiple write I/O requests performed concurrently on files of a file system may select the same cylinder group for allocating data blocks such that the under utilized cylinder group may not include sufficient number of available data blocks for completing every write I/O request.

Further, in such a conventional system, a data block located at a specific logical block number is allocated based on a look-behind operation that evaluates a file system block number of another data block that has been allocated last time such that the file system block number of the other data block is located behind a file system block number associated with the specific logical block number for the data block on a storage device. However, in such a conventional system, a data block is not allocated based on a look-ahead operation which evaluates a file system block number of a data block that has been allocated last time and is located ahead of a file system block number associated with a specific logical block number for the data block on a storage device. Further, in such a conventional system, when a data block is allocated based on a location at which another data block has been allocated last time, storage space used by metadata which may be located between the location of the data block and the location of the last allocated block is not taken into consideration.

By contrast, in at least some implementations in accordance with the technique as described herein, the use of allocating blocks in storage systems technique allocates data blocks for a file of a file system in an order that is same or similar to the order in which the data blocks are logically mapped in a file system hierarchy of the file system. In at least one embodiment of the current technique, a write I/O request for a small sized file allocates a small set of contiguous data blocks (e.g., 4 or 8 data blocks) and a write I/O request for a large sized file allocates a large set of contiguous data block (e.g. 1024 data blocks). Further, in at least one embodiment of the current technique, a counter is used for selecting a cylinder group from a set of cylinder groups for allocating indirect blocks and data blocks. Further, the counter is incremented to point to the next cylinder group in the set of cylinder groups if the selected cylinder group does not include sufficient number of available data blocks for performing a subsequent write I/O request.

Further, in at least one embodiment of the current technique, for allocating an indirect block for a file of a file system, the indirect block is allocated from a cylinder group of a set of cylinder groups of the file system referred to by a counter, and the counter is then updated to point to the next cylinder group such that a subsequent block allocation request for allocating an indirect block evaluates the next cylinder group for allocating an indirect block. Thus, in at least one embodiment of the current technique, data block fragmentation is reduced by allocating a set of contiguous data blocks instead of allocating one data block at a time and allocating data blocks that are located adjacent to a leaf indirect block. Further, in at least one embodiment of the current technique, if a data block is allocated in a cylinder group at a specific location based on a location on a storage device at which another data block has been allocated last time, storage space used by metadata between the specific location and the prior location is evaluated when determining the specific location of the data block.

Further, in at least one embodiment of the current technique, a data block is allocated at a specific offset within a file by performing a look-behind operation that evaluates an offset (e.g. file system block number) on a storage device such that the offset is located behind the specific offset and indicates the location at which another data block has been allocated last time. Further, in such a case, if the look-behind operation is unable to determine a specific offset at which to allocate a data block, a look-ahead operation is performed that evaluates an offset (e.g. file system block number) on a storage device such that the offset is located ahead of the specific offset and indicates the location at which another data block has been allocated last time. Thus, in at least one embodiment of the current technique, I/O performance of a file system is improved by increasing locality of data blocks, minimizing a seek latency, and improving a physical layout of data blocks. A seek latency refers to the amount of time it takes for a disk to find a data block and access the data block for an I/O operation. Thus, a goal of a file system block allocation operation is to reduce a disk seek time by reducing data block fragmentation in the file system and efficiently allocating data blocks when multiple write I/O requests are performed concurrently. Further, in order to reduce data block fragmentation, the file system block allocation operation attempts to allocate a set of contiguous data blocks based on a location at which a data block has been allocated last time by performing the look-behind operation and/or look-ahead operation. Further, a file system data block allocation operation reserves a set of data blocks upon receiving a write I/O request for a file such that subsequent write I/O requests may allocate data blocks from the set of reserved data blocks such that the file is guaranteed to include at least a number of contiguous data blocks.

In at least some implementations in accordance with the technique as described herein, the use of the allocating blocks in storage systems technique can provide one or more of the following advantages: reducing data block fragmentation on a storage device by efficiently allocating data blocks, improving memory and storage utilization by selecting data blocks for allocation in an order that is same or similar to the order in which the data blocks are logically mapped in a file system hierarchy, and improving I/O performance of a file system by efficiently balancing data block allocations among a set of cylinder groups of the file system.

Referring now to FIG. 1, shown is an example of an embodiment of a computer system such as a data storage system that may be used in connection with performing the technique or techniques described herein. A data storage system may be a block based storage system 12 as described herein in FIG. 1. Further, a data storage system may be a file based data storage system as described herein below in FIG. 2. Further, a data storage system may include a block based data storage system component and a file based data storage system component.

While the block based storage system 12 may be configured in a variety of ways, in at least one embodiment, the block based storage system 12 is configured as a storage area network (SAN), such as a CLARiiON™ system, as produced by EMC Corporation of Hopkinton, Mass. While a file based storage system may be configured in a variety of ways, in at least one embodiment, the file based storage system is configured as a network attached storage (NAS) system, such as a Celerra™ system produced by EMC Corporation of Hopkinton, Mass.

The computer system 10 includes one or more block based data storage systems 12 connected to host systems 14*a*-14*n* through communication medium 18. The system 10 also includes a management system 16 connected to one or more block based data storage systems 12 through communication medium 20. In this embodiment of the computer system 10, the management system 16, and the N servers or hosts 14*a*-14*n* may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14*a*-14*n* may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the block based data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the block based data storage systems over an iSCSI or fibre channel connection and the management system may communicate with the block based data storage systems over a separate network connection using TCP/IP. It should be noted that although FIG. 1 illustrates communications between the hosts and block based data storage systems being over a first connection, and communications between the management system and the block based data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the block based data storage systems 12 to perform a data operation. For example, an application executing on one of the host computers 14a-14n may perform a read or write operation resulting in one or more data requests to the block based data storage systems 12.

The management system 16 may be used in connection with management of the block based data storage systems 12. The management system 16 may include hardware and/or software components. The management system 16 may include one or more computer processors connected to one or more I/O devices such as, for example, a display or other output device, and an input device such as, for example, a keyboard, mouse, and the like. A block based data storage system manager may, for example, view information about a current storage volume configuration on a display device of the management system 16. The manager may also configure a block based data storage system 12, for example, by using a management software to define a logical grouping of logically defined devices, referred to elsewhere herein as a storage group (SG), and restrict access to the logical group.

An embodiment of the block based data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). It should be noted that each of the data storage systems may operate stand-alone, or may also included as part of a storage area network (SAN) that includes, for example, other components such as other data storage systems, file based data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the block based data storage system 12 may also include other components than as described for purposes of illustrating the techniques herein.

Figure 2:
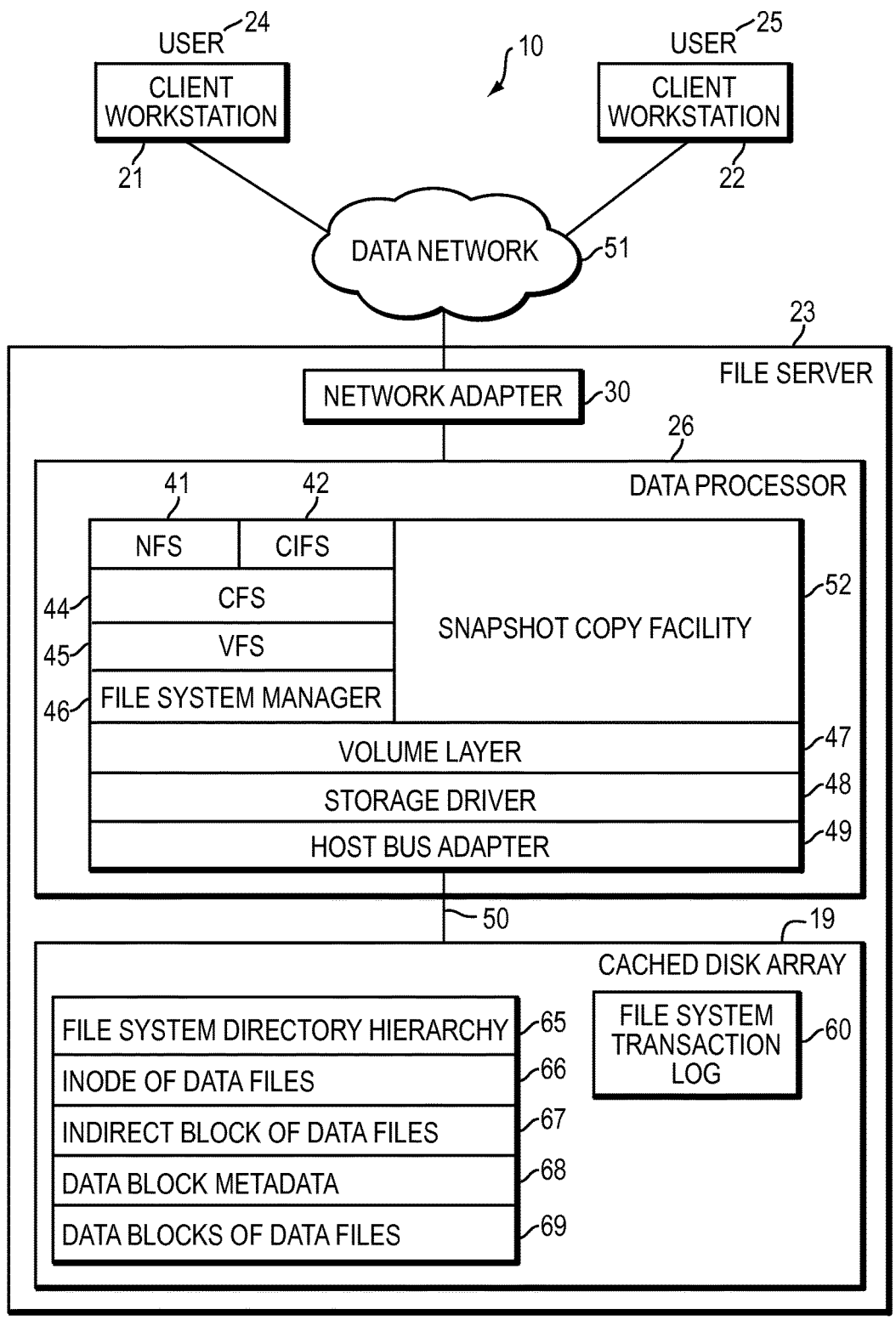

Referring now to FIG. 2, shown is an example of an embodiment of a file based data storage system that may be used in connection with performing the technique or techniques described herein. The file based data storage system 10 includes a data network 51 interconnecting clients 21, 22 and a data storage system such as a network file server 23 (also referred to simply as "file server"). The data network 51 may include any one or more of network connection technologies, such as Ethernet, and communication protocols, such as TCP/IP. The clients 21, 22, for example, are workstations such as personal computers. The workstations are operated by users 24, 25. The user 25 is a system administrator having sufficient privileges for configuring the network file server 23 and for receiving status and error messages from the network file server. Clients 21, 22 may access the network file server 23, for example, in performing input/output (I/O) operations, data requests, and other operations.

Various aspects of the network file server 23 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

The network file server 23 includes at least one data processor 26 and a cached disk array 19. The data processor 26, for example, is a commodity computer. The cached disk array 19 includes multiple disk drives, a high-speed random-access cache memory, and a logical-to-physical mapping between the cache memory and the disk drives.

The data processor 26 has a network interface 30 for communication of data packets over the data network 51 via a data transmission protocol such as TCP/IP. The data processor 26 is programmed with a Network File System (NFS) module 41 for supporting communication with network clients over the data network 51 using the NFS file access protocol, and a Common Internet File System (CIFS) module 42 for supporting communication with network clients over the data network using the CIFS file access protocol. The NFS module 41, and the CIFS module 42 are layered over a Common File System (CFS) module 44, and the CFS module is layered over a Virtual File System (VFS) module 45. The VFS module 45 is layered over a Universal File System (UxFS) module. The UxFS module is a file system manager 46 for managing a file system such as a UNIX-based file system. The CFS module 44 provides higher-level functions common to NFS 41 and CIFS 42.

The file system manager 46 accesses data organized into logical volumes defined by a logical volume layer module 47. Each logical volume maps to contiguous logical storage addresses in the cached disk array 19. The logical volume layer module 47 is layered over a storage driver 48 such as a Fibre-Channel (FC), a Small Computer System Interface (SCSI), and an Internet SCSI (iSCSI) driver. The data processor 26 sends storage access requests through a host bus adapter 49 using a storage protocol such as the FC, SCSI, or iSCSI used by the storage driver 48, depending on the physical data link 50 between the data processor 26 and the cached disk array 19.

Referring again to FIG. 2, the CFS module 44, the VFS module 45, the file system manager 46, the logical volume layer 47, and the storage driver 48 are modules of an operating system program executing on file server 23. The NFS module 41, and CIFS module 42 are internal application programs supported by the operating system. The data processor 26 is programmed with additional internal application programs including a snapshot copy facility 52.

The data network 51 may be any one or more of a variety of networks or other type of communication connections as known to those skilled in the art. For example, the data network 51 may be the Internet, an intranet, network or other wireless or other hardwired connection(s) by which the clients 21, 22 may access and communicate with the network file server 23, and may also communicate with other components (not shown) that may be included in the network file server 23. Each of clients 21, 22 and the network file server 23 may be connected to the data network 51 by any one of a variety of connections as may be provided and supported in accordance with the type of data network 51.

The processors included in the clients 21, 22 and data processor 26 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the network file server 23 are described herein in more detail, and may vary with each particular embodiment. Each of the clients 21, 22 and the network file server 23 may all be located at the same physical site, or, alternatively, may also be located in different physical locations. Some or all of the connections by which the clients 21-22 and the network file server 23 may be connected may pass through other communication devices, such as a Connectrix or other switching equipment that may exist such as a phone line, a repeater, a multiplexer or even a satellite.

Each of the clients 21, 22 may perform different types of data operations in accordance with different types of tasks. In the embodiment of FIG. 2, any one of the clients 21, 22 may issue a data request to the network file server 23 to perform a data operation. For example, an application executing on one of the clients 21, 22 may perform a read or write operation resulting in one or more data requests to the network file server 23.

An embodiment of the data storage system 10 may include one or more network file servers. Each of the network file server may include one or more data storage devices, such as disks. Each of the network file server included in data storage system 10 may be inter-connected (not shown). Additionally, the network file servers may also be connected to the clients through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the clients, for example, to the network file server 23.

It should be noted that each of the network file server may operate stand-alone, or may also included as part of a storage area network (SAN) that includes, for example, other components such as other network file servers.

Each of the network file servers of element 10 may include a plurality of disk devices or volumes. The particular network file server and examples as described herein for purposes of illustration should not be construed as a limitation. Other types of commercially available data storage systems, as well as processors and hardware controlling access to these particular devices, may also be included in an embodiment.

Clients, such as 21, 22, provide data and access control information through channels to the storage systems, and the storage systems may also provide data to the clients also through the channels. The clients do not address the disk drives of the storage systems directly, but rather access to data may be provided to one or more clients from what the clients view as a plurality of file systems. A file system is created from a logical device or logical volume. The logical volume may or may not correspond to an actual disk drive. For example, one or more logical volumes may reside on a single physical disk drive. Data in a single storage system may be accessed by multiple clients allowing the clients to share the data residing therein. A LUN (logical unit number) may be used to refer to one of the foregoing logically defined devices or volumes.

In such an embodiment in which element 10 of FIG. 2 is implemented using one or more data storage systems, each of the data storage systems may include code thereon for performing the techniques as described herein. In following paragraphs, reference may be made to a particular embodiment such as, for example, an embodiment in which element 10 of FIG. 2 includes a single data storage system, multiple data storage systems, a data storage system having multiple data processors, and the like. However, it will be appreciated by those skilled in the art that this is for purposes of illustration and should not be construed as a limitation of the techniques herein. As will be appreciated by those skilled in the art, the network file server 23 may also include other components than as described for purposes of illustrating the techniques herein.

As shown in the data storage system 10 in FIG. 2, a file system stored on a storage device is organized as a hierarchy. At the top of the hierarchy is a hierarchy of the directories 65 in the file system. Inodes of data files 66 depend from the file system directory hierarchy 65. Indirect blocks of data files 67 depend from the inodes of the data files 66. Data block metadata 68 and data blocks of data files 69 depend from the inodes of data files 66 and from the indirect blocks of data files 67. Specific examples of this hierarchy are further described below with reference to FIGS. 3 and 4. File systems typically include metadata describing attributes of a file system and data from a user of the file system. A file system contains a range of file system blocks that store metadata and data. In at least some embodiments of the current technique, the file system block may be 8 kilobytes (KB) in size. Further, a user of data storage system 10 creates files in a file system.

The data storage system 10 also includes journal such as a file system transaction log 60. In at least one embodiment of the current technique, a journal may include a persistent log or a persistent file that may be used to update metadata of a file system stored on a persistent storage. Generally, any change in metadata of a file system may first be written to file system transaction log 60. Metadata information stored in the file system transaction log 60 is later used to recover the file system when file server 23 reboots due to a failure. Upon reboot of file server 23, file system transaction log 60 is inspected to find a last valid transaction recorded in the log 60, and the last valid transaction is applied to the file system stored on a persistent storage for updating metadata of the file system by using metadata information stored in file system transaction log 60.

Figure 3:
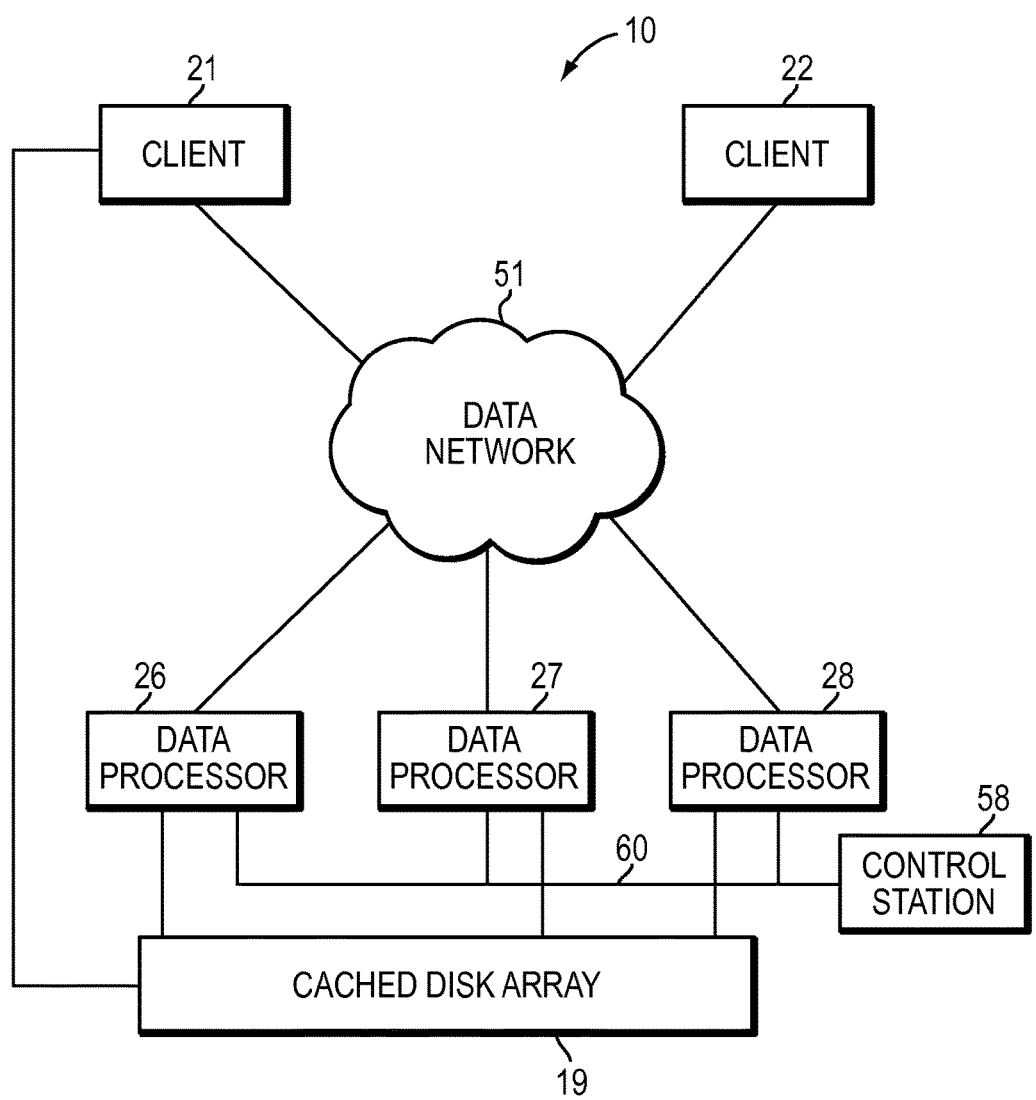

Referring now to FIG. 3, shown is the network file server 23 of FIG. 2 that may further include a control station 58 and additional data processors (such as data processors 27, 28) sharing the cached disk array 19. A dual-redundant data link 60 interconnects the data processors 26, 27, 28 to the control station 58. The control station 58 monitors a heartbeat signal from each of the data processors 26, 27, 28 in order to detect a data processor failure. If a failed data processor cannot be successfully re-booted, the control station 58 will "fence off" the failed data processor and re-assign or fail-over the data processing responsibilities of the failed data processor to another data processor in the network file server 23. The control station 58 also provides a user interface between the system administrator 25 and the network file server 23.

Figure 4:
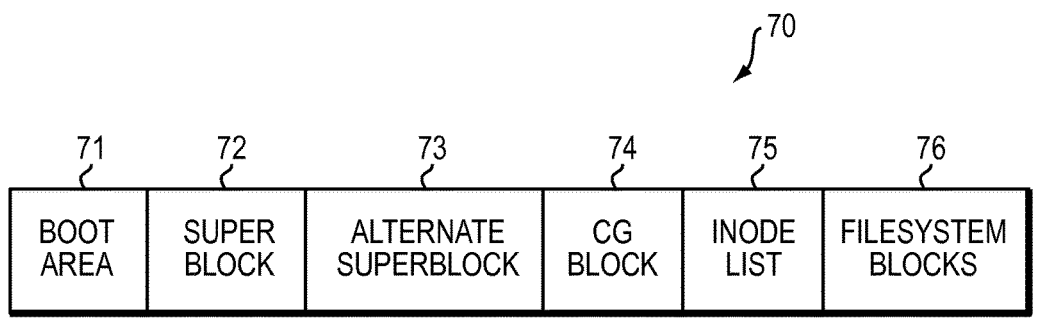
FIGS. 4-9 are diagrams illustrating in more detail components that may be used in connection with techniques herein.

Referring to FIG. 4, shown is a representation of an on-disk layout of a file system that may be included in an embodiment using the current techniques described herein. A file system 70 includes a boot area 71, a superblock 72, an alternate superblock 73, Cylinder Group (CG) block 74, an inode list 75, and file system blocks 76. The boot area 71 may contain code for booting an operating system of file server 23. The superblock 72 and alternate super block 73 contains attributes and metadata of the file system. Cylinder Group block 74 contains metadata information pertaining to cylinder groups of the file system. Inode list 75 includes the list of all inodes of each file that is present in the file system.

Figure 5:
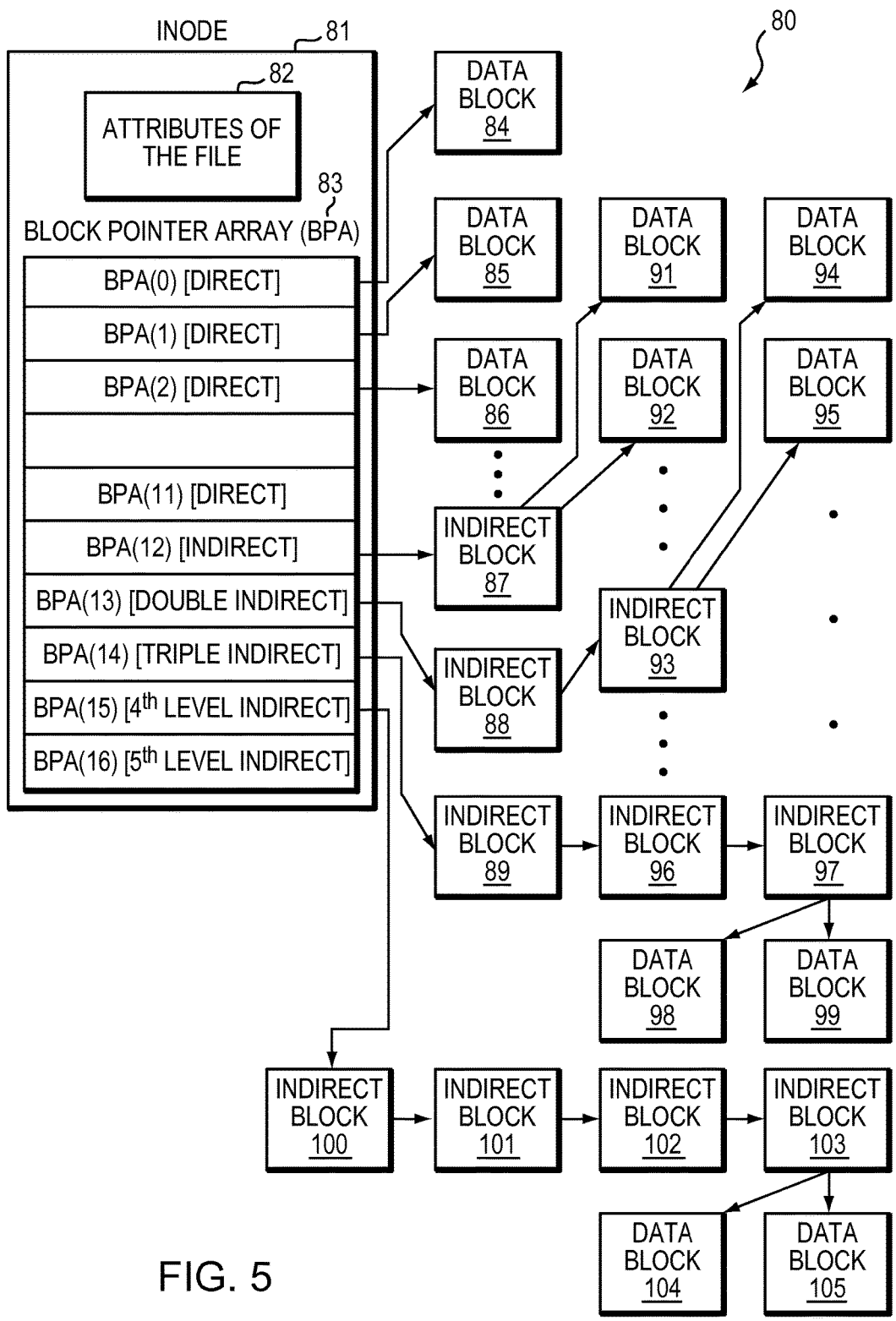

A file system 70 includes one or more file system blocks 76. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. However, it should be noted that a file system may be organized based on any one of the known mapping techniques such as an extent based binary tree mapping mechanism Referring to FIG. 5, shown is a representation of an inode of a file that may be included in an embodiment using the techniques described herein. A file includes an inode 81 containing attributes 82 (such as atime and mtime) of the file, and a block pointer array 83. The block pointer array 83 has seventeen block pointer array entries BPA(0) to BPA (16). The first of up to twelve entries BPA(0) to BPA(11) directly point to the first of up to twelve data blocks (e.g., 84, 85, 86), of the file. If the file contains more than twelve data blocks, then the thirteenth entry of the block pointer array 83 contains an indirect block pointer BPA(12) pointing to an indirect block 87 containing pointers to one or more additional data blocks (e.g., 91, 92). If the file contains so many data blocks that the indirect block 87 becomes full of block pointers, then the fourteenth entry of the block pointer array 83 contains a double indirect block pointer BPA(13) to an indirect block 88 that itself points to an indirect block 93 that points to one or more additional data blocks (e.g., 94, 95). If the file is so large that the indirect block 88 becomes full of block pointers and its descendant indirect blocks are also full of block pointers, then the fifteenth entry of the block pointer array 83 contains a triple indirect block pointer BPA(14) to an indirect block 89 that points to an indirect block 96 that points to an indirect block 97 that points to one or more additional data blocks (e.g., 98, 99). Similarly the file may include fourth (BPA(15)) and fifth (BPA(16)) level of indirections indicated by indirect blocks 100-103 and data blocks 104-105.

Figure 6:
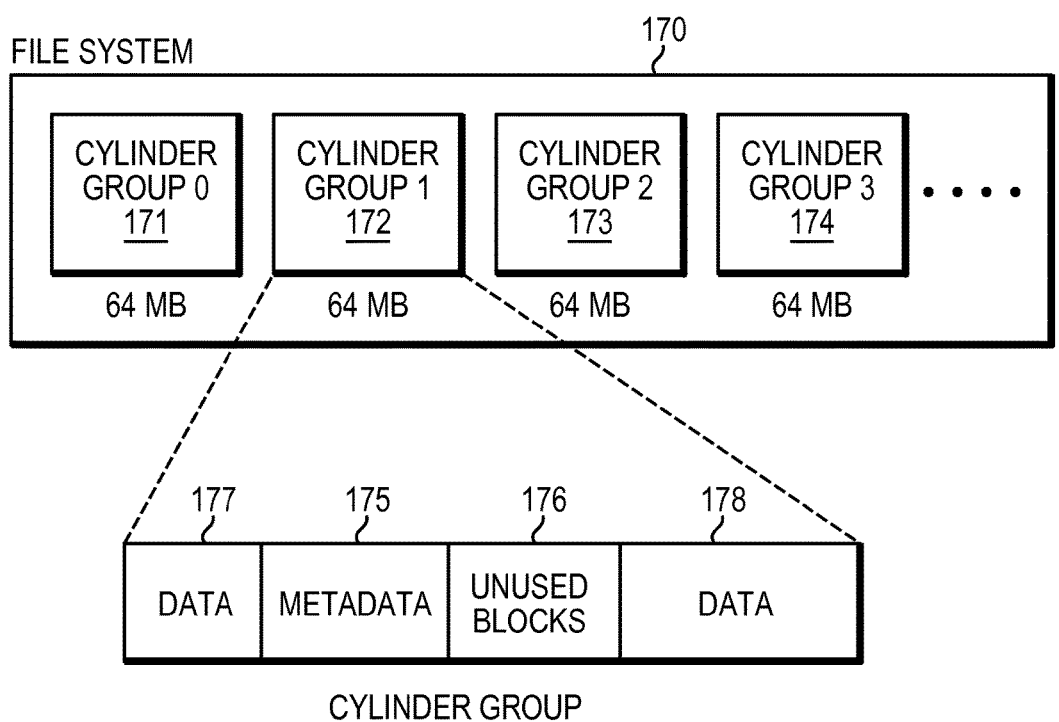

Referring to FIG. 6, shown is a more detailed representation of components that may be included in an embodiment using the techniques herein. A physical address space of a file system is typically divided into equal sized chunks. Each chunk is known as a cylinder group. In at least some embodiments of the current technique, size of the cylinder group may be 64 megabytes (MB). For example, in FIG. 6, file system 170 includes cylinder groups 171-174. A cylinder group in a file system includes a range of file system blocks. A part of each cylinder group stores metadata 175 of the file system occupying one or more file system blocks and a part of each cylinder group stores user's data 177, 178 occupying one or more file system blocks. Further, as illustrated in FIG. 6, metadata 175 may be located at the start of a cylinder group, at the end of the cylinder group or in between two portions containing data.

Figure 7:
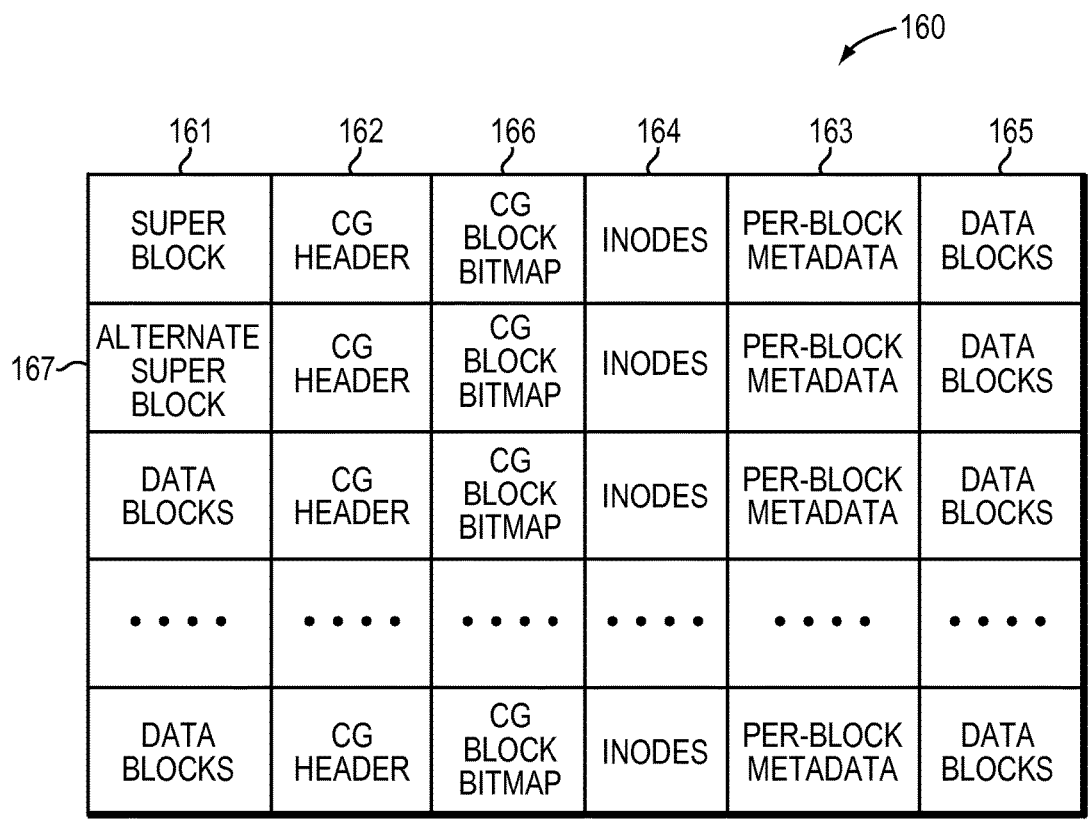

Referring to FIG. 7, shown is a memory map of a logical extent of a file system that may be included in an embodiment using the techniques herein. A logical extent of the file system is subdivided into self-contained cylinder groups. Each cylinder group is of fixed size, such that the size of the cylinder group is the granularity of storage provisioning for the file system. For example, if the file system block size is 8 kilobytes (KB), size of the file system is 4 gigabyte (GB) and size of the cylinder group is 64 megabytes (MB), the file system may include sixty four cylinder group entries, and each cylinder group entry may include 8192 file system blocks. A part of each cylinder group contains metadata of the file system. Other part of each cylinder group contains user's data that is stored in one or more data blocks. Further, each cylinder group includes metadata information that includes a redundant copy of the super-block of a file system, inodes of files of the file system, a bit map describing available blocks in the cylinder group, and information describing the usage of data blocks within the cylinder group. With reference to FIG. 7, each cylinder group (CG) of the file system 160 is a respective row in this memory map. A first cylinder group of the file system 160 indicated by first row of the memory map contains a superblock 161 of the file system, a cylinder group header 162, file system blocks for per-block metadata (BMD) 163 for storing metadata of file system blocks in the cylinder group, inodes 164 of files of file system 160, file system data blocks 165 for the cylinder group, and a cylinder group block bitmap 166 indicating whether or not each file system block in the cylinder group is allocated or not. A second cylinder group of the file system 160 indicated by second row of the memory map has the same format as the first cylinder group. The alternate superblock 167 of the second cylinder group is a copy of the superblock 161 of the first cylinder group. Other cylinder groups have the same format except they do not have a superblock. A file system block can be in one of three states: allocated, free, or reserved. A reserved file system block cannot be allocated or freed. The allocated/free state of a file system block is tracked in the cylinder group block bitmap. Each cylinder group maintains a per-block metadata (BMD) for all file system blocks that it owns. The file system 160 populates the per-block block metadata as and when a file system block is allocated—either for an indirect block or any other metadata block. The per-block metadata 163 is not directly accessible to a network client, and instead it is implicitly accessed in the process of a file system operation that makes use of the cylinder group or file system block contents. For example, the process of allocating or freeing a block of the cylinder group validates and updates block metadata owner state. It should be noted that the memory map of a cylinder group may include other fields (not shown in the FIG. 8) that may be included in a file system stored in data storage system 10.

Figure 8:
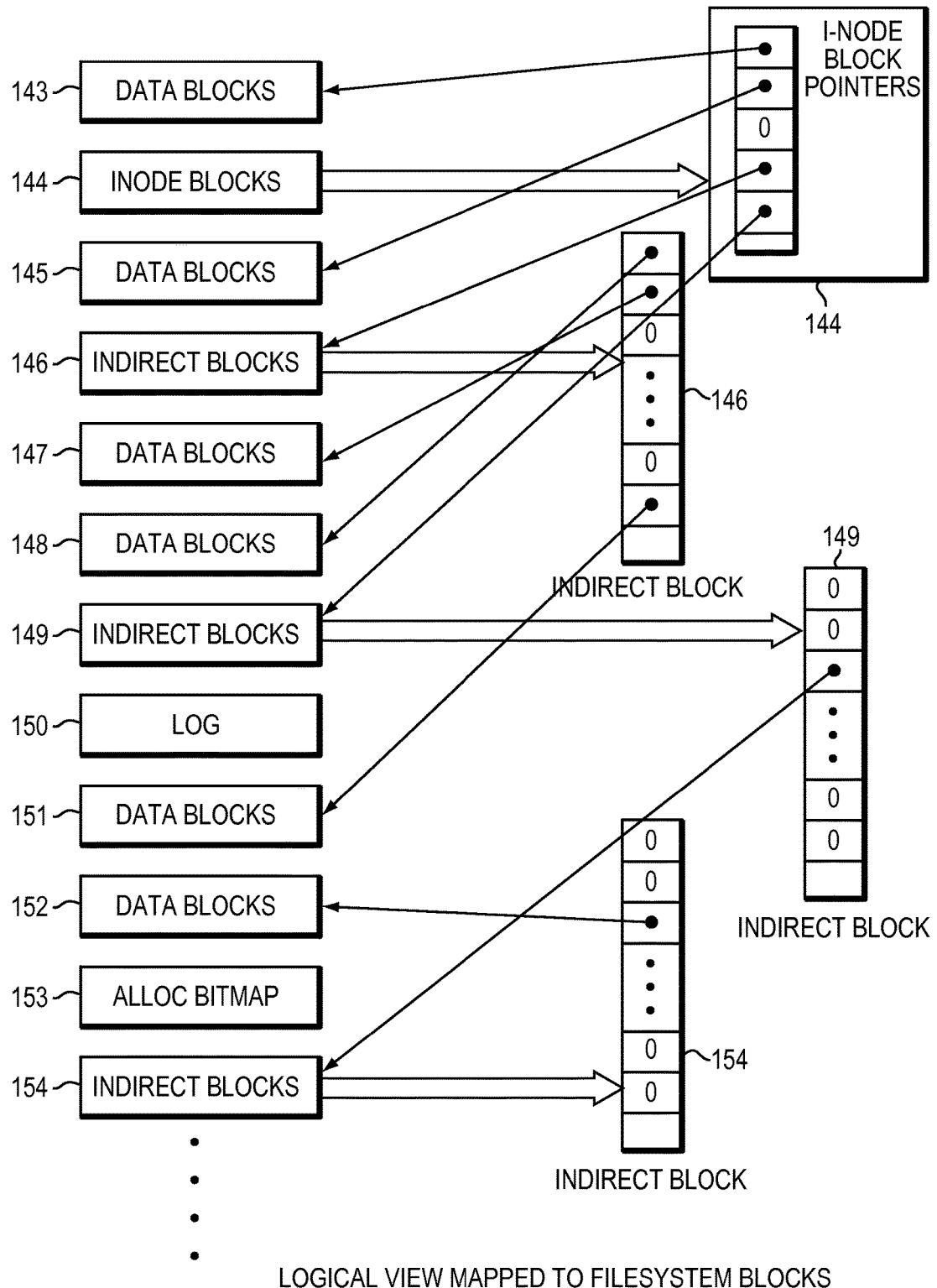

Referring to FIG. 8, shown is a logical and a corresponding physical representation of a file system depicting a standard hierarchical UNIX-based file system using an indirect mapping protocol that may be included in an embodiment using the techniques herein. A file system includes one or more file system blocks. Some of the file system blocks are data blocks 143, 145, 147, 148, 151 and 152, some file system blocks may be indirect block 146, 149 and 154 as described below, or some file system blocks are free blocks that have not yet been allocated to any file in the file system. The first of up to twelve entries of block pointers in the inode 144 directly point to the first of up to twelve data blocks 143, 145, etc. of the file. If the file contains more than twelve data blocks, then the thirteenth entry of the block pointer array 144 contains an indirect block pointer pointing to an indirect block 146 containing pointers to one or more additional data blocks 147, 148, 151, etc. If the file contains so many data blocks that the indirect block 146 becomes full of block pointers, then the fourteenth entry of the block pointer array 144 contains a double indirect block pointer to an indirect block 146 that itself points to an indirect block 149 that points to one or more additional data blocks 152, etc. If the file is so large that the indirect block 149 becomes full of block pointers and its descendant indirect blocks are also full of block pointers, then the fifteenth entry of the block pointer array 144 includes another level of indirection where the block pointer entry contains a triple indirect block pointer to an indirect block that points to an indirect block that points to an indirect block that points to one or more additional data blocks. Similarly there exists fourth and fifth level of indirections. Once the indirect blocks at last level of indirection and its descendant indirect blocks become full of pointers, the file contains a maximum permitted number of data blocks. Log 150 provides transactional semantics to a file system and minimizes number of metadata I/Os by logging updates to metadata of the filesystem in the log 150. Allocation bitmap 153 tracks which file system blocks are free in a file system. An entry indicating a value zero in an indirect block represents unallocated regions of a File or a LUN.

Figure 9:
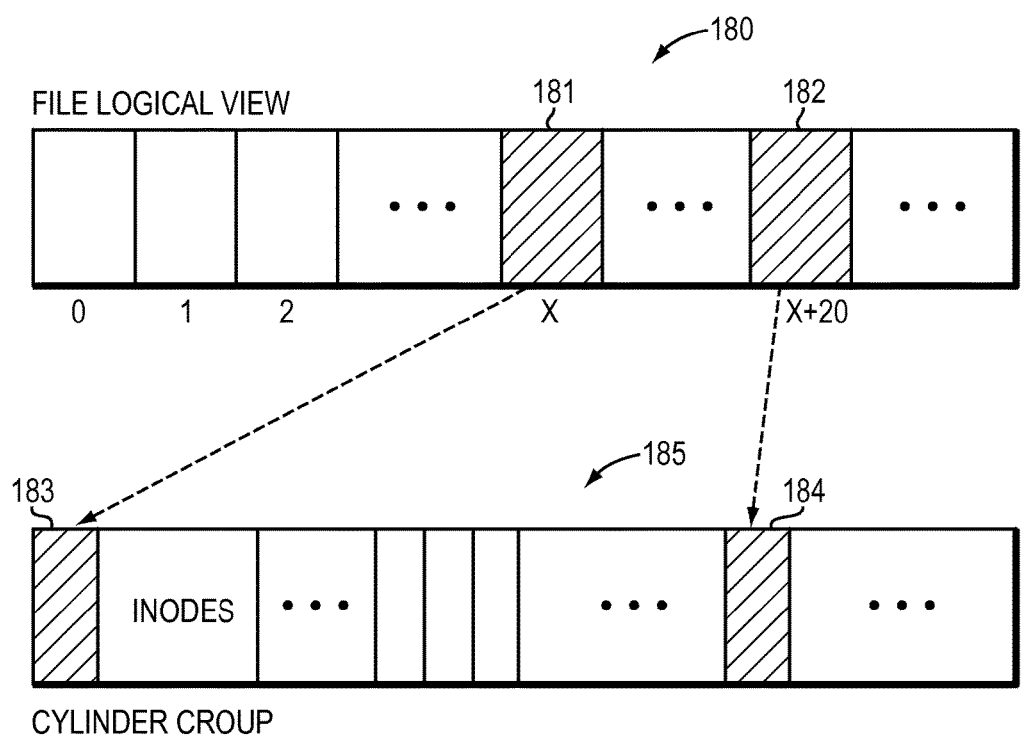

Referring to FIG. 9, shown is detailed representation of components that may be included in an embodiment using the techniques herein. FIG. 9 shows an illustration of a logical and physical view of a file of a file system. Generally, a file is accessed for reading and/or writing data of the file using a logical block number associated with an offset of the file at which an I/O operation is performed. Thus, if the order in which data blocks of a file are mapped in a logical view of the file is same or similar to the order in which the data blocks are allocated on a storage device, performance of an I/O operation performed on the file improves. For example in FIG. 9, data blocks in logical view 180 of a file are mapped to the physical layout of the data blocks on cylinder group 185. If a request to allocate a data block for the file is received, the data block is allocated based on a location at which another data block has been allocated last time. For example, if a data block 183 in cylinder group 185 has been allocated to the file at logical offset "X" 181 and a write I/O request is received subsequently for writing data at logical offset "X+20" 182, data storage system 10 attempts to find a free data block in the cylinder group 185 at a file system block address indicated by adding the logical offset "20" to the file system block address of the last allocated data block

183. Further, the data storage system 10 determines if there is metadata stored between the file system data blocks 183 and 184. Upon determining that metadata is stored between file system data blocks 183 and 184, the data storage system 10 uses the size of the metadata for computing a file system block address at which data block mapped at logical block number 182 may be allocated on a storage device. Thus, file system block address for location 184 is computed as "X+20+metadata size". Further, for example, if data block 184 in cylinder group 185 has been allocated to the file at logical offset "X+20" 182 and a write I/O request is received subsequently for writing data at logical offset "X" 181, data storage system 10 attempts to find a free data block in the cylinder group 185 by performing a look-behind operation thereby subtracting the logical offset "20" from block address of the last allocated data block 184.

Figure 10:
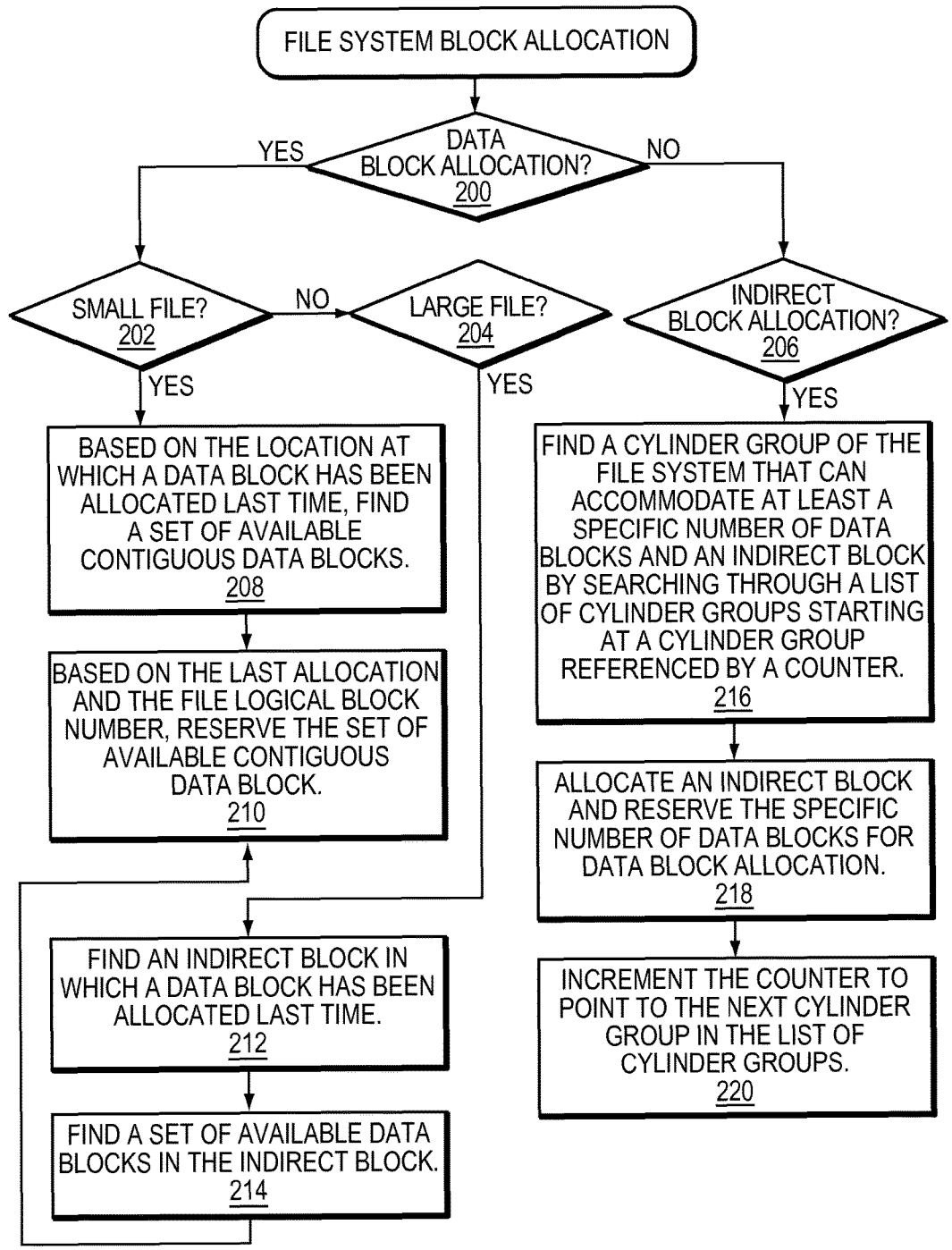
FIG. 10 is a flow diagram illustrating processes that may be used in connection with techniques herein.

Referring to FIG. 10, shown is a flow diagram illustrating the method of allocating blocks in storage systems. A request to allocate a block at a specific offset for a file of a file system is received. In at least one embodiment of the current technique, a determination is made as to whether the request is for allocating a data block (step 200). If the request is for allocating a data block, a determination is made as to whether the file is a small sized file (step 202). A small sized file may be a file that does not include any indirect block in the inode of the file. Thus, a small sized file may only include a set of direct data blocks in the inode of the file. In at least one embodiment of the current technique, a set of data blocks that are located contiguously on a storage device are allocated and reserved for subsequent allocations that may use a data block from the set of data blocks. Thus, a data block allocation is performed by reserving a chunk of storage space which indicates a set of contiguous data blocks in a cylinder group that are available for allocation. Further, based on a location at which the last data block allocation has been performed, a set of contiguous data blocks are selected for allocation (step 208). It should be noted that a set of contiguous data blocks may be located either after or before a location on a storage device at which a data block has been allocated last time. Further, the set of contiguous data blocks are reserved for allocation based on the location of the last allocated data block and file system block number of the specific offset (step 210).

In at least one embodiment of the current technique, once a set of data blocks is reserved for allocation, subsequent data block allocation requests may allocate a data block from the set of data blocks. However, if a subsequent data block allocation request is unable to allocate a data block from the set of contiguous data blocks that is reserved for allocation, a new chunk of contiguous data blocks is searched and reserved for allocation. Further, a logical block number is used for determining whether a subsequent data block allocation request may select a data block from a set of contiguous data blocks that has been reserved for allocation. In at least one embodiment of the current technique, a cylinder group may include a set of data blocks (e.g. 8192 data blocks) and the size of a chunk that is reserved for allocation may be 4 contiguous data blocks. Thus, for example, a cylinder group may include 2048 chunks of contiguous data blocks. Thus, if a subsequent data block allocation request is unable to find an available data block from a set of contiguous data blocks that has been reserved during the last data block allocation, the subsequent data block allocation request may look for a new chunk of contiguous data blocks may be searched within the same cylinder group in which the set of contiguous data blocks has been reserved.

Thus, in at least one embodiment of the current technique, for allocating a data block for a first write request, data storage system 10 finds and reserves a chunk of contiguous data blocks (e.g., 4 data blocks, 8 data blocks) for allocation. Further, for allocating a data block for a subsequent write request, a free data block is selected from the chunk of contiguous data blocks based on a file system block number of another data block that has been allocated last time. However, if no available data block exists in the chunk of contiguous data blocks, data storage system 10 finds a new chunk of contiguous data blocks and reserve the new chunk for allocation. Further, for allocating a data block for a subsequent write request, the new chunk of storage space is evaluated based on a file system block number of another data block that has been allocated last time. Further, the new chunk of storage space may either be located behind or ahead to the file system block number at which the other data block has been allocated last time. Thus, in at least one embodiment of the current technique, data blocks that are part of a chunk of contiguous data blocks are allocated in the same order as the order in which the data blocks are logically mapped in a file system hierarchy. Thus, for example, if the size of a chunk is 4 data blocks and the size of a data block is 8192 bytes (8 KB), 32 Kilobytes (KB) portion of a file is guaranteed to be sequential in nature.

In at least one embodiment of the current technique, if a data block allocation request is for a large sized file (step 204), data storage system 10 determines an indirect block from which a data block has been allocated last time (step 212). A large sized file may be a file that includes a set of direct data blocks and a set of indirect blocks. Generally, data blocks are located adjacent to an indirect block on a storage device. Thus, based on the location of the indirect block and a logical block number within the file, a set of available data blocks in the indirect block are reserved and allocated (step 214).

Further, in at least one embodiment of the current technique, if the request is for allocating an indirect block (step 206), a cylinder group counter is used to select a cylinder group from a set of cylinder groups of the file system for determining whether the cylinder group includes sufficient storage space for allocating an indirect block and a set of contiguous data blocks that may be referenced by the indirect block (step 216). For example, in at least one embodiment of the current technique, the number of data blocks that may be referenced by an indirect block is 2048 data blocks. If the cylinder group referenced by the cylinder group counter does not include sufficient available storage space, a next cylinder group of the set of cylinder groups is evaluated for allocating an indirect block and a set of data blocks. Thus, cylinder groups of the set of cylinder groups are evaluated in sequence starting from the cylinder group referenced by the cylinder group counter in order to find a cylinder group that can accommodate an indirect block and a set of data blocks. Upon finding a cylinder group, an indirect block is allocated in the cylinder group and a set of data blocks are reserved for allocating data blocks for subsequent data block allocation requests (step 218). Further, the cylinder group counter is incremented to point to a next cylinder group of the set of cylinder groups such that a subsequent request for an indirect block allocation may evaluate the next cylinder group for allocating an indirect block (step 220).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in allocating blocks in storage systems, the method comprising:
receiving a block allocation request for a file of a file system at an offset;
determining a first location within a logical address space of the file system at which a last block allocation request has allocated a block for the file;
based on the first location, determining a second location on a storage device at which to reserve a set of blocks, wherein the second location is based on the first location and the offset, wherein the second location is determined on the storage device based on an order in which blocks of the file system are organized in a file system hierarchy;
based on the second location, reserving the set of blocks, wherein subsequent block allocation requests for the file allocate a block from the set of reserved blocks;
determining a type of the file; and
determining whether to allocate an indirect block from a cylinder group of a set of cylinder groups from which a last indirect block has been allocated upon determining that the type of the file indicates a large sized file, wherein the cylinder group is selected from the set of cylinder groups for allocating the indirect block upon determining availability of a set of contiguous data blocks in the cylinder group.

2. The method of claim 1, wherein a logical address space of the file system is apportioned into the set of cylinder groups, wherein each cylinder group of the set of cylinder groups is configured to store metadata and data of the file system.

3. The method of claim 1, wherein a cylinder group of the set of cylinder groups stores data and metadata of the file system in a set of file system blocks.

4. The method of claim 1, wherein the file of the file system is associated with an inode, wherein the file includes a set of data blocks and a set of indirect blocks.

5. The method of claim 1, wherein the type of the file includes a small sized file and a large sized file.

6. The method of claim 1, wherein each data block of the set of data blocks is contiguously located on a storage device.

7. The method of claim 1, further comprising:
identifying a cylinder group from the set of cylinder groups, wherein a cylinder group counter specifies the cylinder group;
determining whether the cylinder group includes storage space for allocating an indirect block and a set of data blocks;
based on the determination, allocating the indirect block from the cylinder group and reserving the set of data blocks; and
updating the cylinder group counter to refer to a next cylinder group in the set of cylinder groups.

8. The method of claim 1, further comprising:
determining an indirect block, wherein a data block has been allocated from the indirect block during a last block allocation request; and
based on the determination and a file logical block number, reserving another set of data blocks from the indirect block.

9. A system for use in allocating blocks in storage systems, the system comprising a processor configured to:
receive a block allocation request for a file of a file system at an offset;
determine a first location within a logical address space of the file system at which a last block allocation request has allocated a block for the file;
based on the first location, determining a second location on a storage device at which to reserve a set of blocks, wherein the second location is based on the first location and the offset, wherein the second location is determined on the storage device based on an order in which blocks of the file system are organized in a file system hierarchy;
based on the second location, reserve the set of blocks, wherein subsequent block allocation requests for the file allocate a block from the set of reserved blocks;
determine a type of the file; and
determine, whether to allocate an indirect block from a cylinder group of a set of cylinder groups from which a last indirect block has been allocated upon determining that the type of the file indicates a large sized file, wherein the cylinder group is selected from the set of cylinder groups for allocating the indirect block upon determining availability of a set of contiguous data blocks in the cylinder group.

10. The system of claim 9, wherein a logical address space of the file system is apportioned into the set of cylinder groups, wherein each cylinder group of the set of cylinder groups is configured to store metadata and data of the file system.

11. The system of claim 9, wherein a cylinder group of the set of cylinder groups stores data and metadata of the file system in a set of file system blocks.

12. The system of claim 9, wherein the file of the file system is associated with an inode, wherein the file includes a set of data blocks and a set of indirect blocks.

13. The system of claim 9, wherein the type of the file includes a small sized file and a large sized file.

14. The system of claim 9, wherein each data block of the set of data blocks is contiguously located on a storage device.

15. The system of claim 9, further comprising:
identify a cylinder group from the set of cylinder groups, wherein a cylinder group counter specifies the cylinder group;
determine whether the cylinder group includes storage space for allocating an indirect block and a set of data blocks;
allocate, based on the determination, the indirect block from the cylinder group and reserving the set of data blocks; and
update the cylinder group counter to refer to a next cylinder group in the set of cylinder groups.

16. The system of claim 9, further comprising:
determine an indirect block, wherein a data block has been allocated from the indirect block during a last block allocation request; and
reserve, based on the determination and a file logical block number, another set of data blocks from the indirect block.

* * * * *